United States Patent
Hsiao et al.

(10) Patent No.: US 7,274,864 B2
(45) Date of Patent: Sep. 25, 2007

(54) METHOD AND DEVICE FOR DIGITAL VIDEO CAPTURE

(75) Inventors: Kenny Hsiao, Keelung (TW); Yang Lu, Keelung (TW)

(73) Assignee: InterVideo Digital Technology Corporation, Taipei (TW)

(*) Notice: Subject to any disclaimer, the term of this patent is extended or adjusted under 35 U.S.C. 154(b) by 1201 days.

(21) Appl. No.: 10/057,964

(22) Filed: Jan. 29, 2002

(65) Prior Publication Data

US 2002/0168181 A1 Nov. 14, 2002

(30) Foreign Application Priority Data

May 11, 2001 (TW) .................. 90111383 A

(51) Int. Cl.
- H04N 7/26 (2006.01)
- H04N 5/00 (2006.01)
- H04N 5/14 (2006.01)

(52) U.S. Cl. .................. 386/124; 386/125; 348/700
(58) Field of Classification Search ............ 386/124, 386/125, 126, 46, 70; 348/699, 700; 382/236
See application file for complete search history.

(56) References Cited

U.S. PATENT DOCUMENTS

| | | | | |
|---|---|---|---|---|
| 5,532,833 A | * | 7/1996 | Hong et al. ............ | 386/77 |
| 5,649,046 A | * | 7/1997 | Stewart et al. .......... | 386/52 |
| 5,805,733 A | * | 9/1998 | Wang et al. ............ | 382/232 |
| 6,118,924 A | * | 9/2000 | Nakatani et al. ........ | 386/70 |
| 6,321,024 B1 | * | 11/2001 | Fujita et al. ............ | 386/55 |
| 6,400,890 B1 | * | 6/2002 | Nagasaka et al. ....... | 386/69 |
| 2003/0086021 A1 | * | 5/2003 | Tojo ..................... | 348/700 |

FOREIGN PATENT DOCUMENTS

| | | |
|---|---|---|
| JP | 05-030464 | 2/1993 |
| JP | 05-290549 | 11/1993 |
| JP | 11-249819 | 9/1999 |
| TW | 388027 | 3/1999 |

\* cited by examiner

*Primary Examiner*—Thai Q. Tran
*Assistant Examiner*—Syed Y. Hasan
(74) *Attorney, Agent, or Firm*—Rabin & Berdo, PC

(57) ABSTRACT

A method and a device of digital video capture for capturing recorded video data into a computer system. In one embodiment, the device may include a reading unit to read frames of video data, a detection unit to estimate scene changes, a determining unit to determine a file size for being split so that an identical scene will not be split into two different files, and a splitting unit to split video data, and then to store the split video data into several video files separately. The invention can split video data into several whole video files, and store frames of the same scene into the same video file. It effectively improves the quality and effect of video editing.

26 Claims, 3 Drawing Sheets

METHOD AND DEVICE FOR DIGITAL VIDEO CAPTURE

This application incorporates by reference Taiwan application Serial No. 90111383, Filed May 11, 2001.

BACKGROUND OF THE INVENTION

1. Field of the Invention

This invention relates to non-linear video editing, and more particularly to a method and a device for seamless capture.

2. Description of the Related Art

Formerly, some traditional linear video editing methods needed to spend a lot of time and money in completing a processing effect, which was sometimes even difficult to be achieved. When the process of video editing enters non-linear editing, processing effect can be easily achieved by an equipment of non-linear video editing in a computer. Moreover, a linear video editing can not compete with a non-linear video editing in video quality, effect, expenditure, time, and application. Especially since 1995, digital video camcorders (DVC), after being on the market, have been massively adopted by mass media such as television etc. It is widely favored by the main trend of video customers currently. A DVC adopts the latest video skill, which makes great strides toward a new milestone in the processing of video editing. A DVC is a camcorder recording video and audio by digitalized method, and using high compressing ratio to write the compressed digital video into a tape. Therefore, a DVC provides video of high quality, digital video and audio, and a design of convenient operation. When we use a DVC to video a subject, no matter what topic it is (people, place, or things), we would almost rather divide a subject into several times and proceed to video than finish a whole video at once. Recording date, recording time, and time code will be recorded on a tape at the same time when a record button is pressed by a user. According to this, a DVC can offer a function of scene change detection. That is an individual part of each scene can be completed without manually dividing each scene. A user can quickly find the wanted scene in stead of spending much effort to look for the wanted scene from a tape with length of 10 minutes.

Nowadays, most non-linear video editing equipment has to cooperate with a computer and proceed to process special effects, such as video capture, clipping, and subtitles, by related editing software. Therefore, the facilities for video editing, including related hardware and software, play an important role in a solving plan for video editing. Traditionally a DVC equipment provides a function of seamless capture, which can capture a 20-mm digital video tape. However, it needs a large space to store the captured digital video. Take a digital video format as an example. A one-minute video will probably occupy space of 210 MB. To store captured video into a computer file system of FAT 32, which just has a hard drive capacity of 4 GB as a limitation, a user can only store a video file of a maximum content of a 20-mm tape. For this reason, the size of the file of captured video is limited by the capacity of 4 GB.

In order to overcome the limitation of 4 GB hard drive capacity in a computer file system, a method which was often used before is to estimate the file size of a video first, to split the video which is greater than 4 GB into several video files that is less than 4 GB, and then store them. General speaking, under the video standard of National Television Standards Committee (NTSC) a DVC can video 30 frames per minute, and a video data normally consists of several scenes. This will create more than ten thousand frames in an eight-minute video. Therefore, the traditional method of splitting video, to proceed to split a video by only judging its size, often splits frames of the same scene and stores them into different video files. It makes the process of video editing more difficult.

SUMMARY OF THE INVENTION

It is therefore an object of the invention to provide a method and a device for digital video capture. The invention can split video data into several whole video files, and store frames of the same scene into the same video file. It effectively improves the quality and effect of video editing.

The invention achieves the above-identified object by providing a method of digital capture to capture video data into a computer system. The method includes following steps. Frames of video data are firstly read and the double estimates are then proceeded by measuring file size of captured video data and detecting whether or not any scene changes between frames. Finally, the video data are split and stored into several video files.

It is another object of the invention to provide a device of digital video capture for capturing recorded video data to a computer system. The device comprises a reading unit, a detection unit and a splitting unit. A reading unit is for reading video data. A detection unit is for estimating file size of captured video data and detecting changes of scenes. A splitting unit is for splitting video data into several video files and store those video files into a storage unit.

BRIEF DESCRIPTION OF THE DRAWINGS

The object, features, and advantages of the invention will become apparent from the following detailed description of the preferred but non-limiting embodiments. The description is made with reference to the accompanying drawings, in which.

DESCRIPTION OF THE PREFERRED EMBODIMENT

Figure 1:
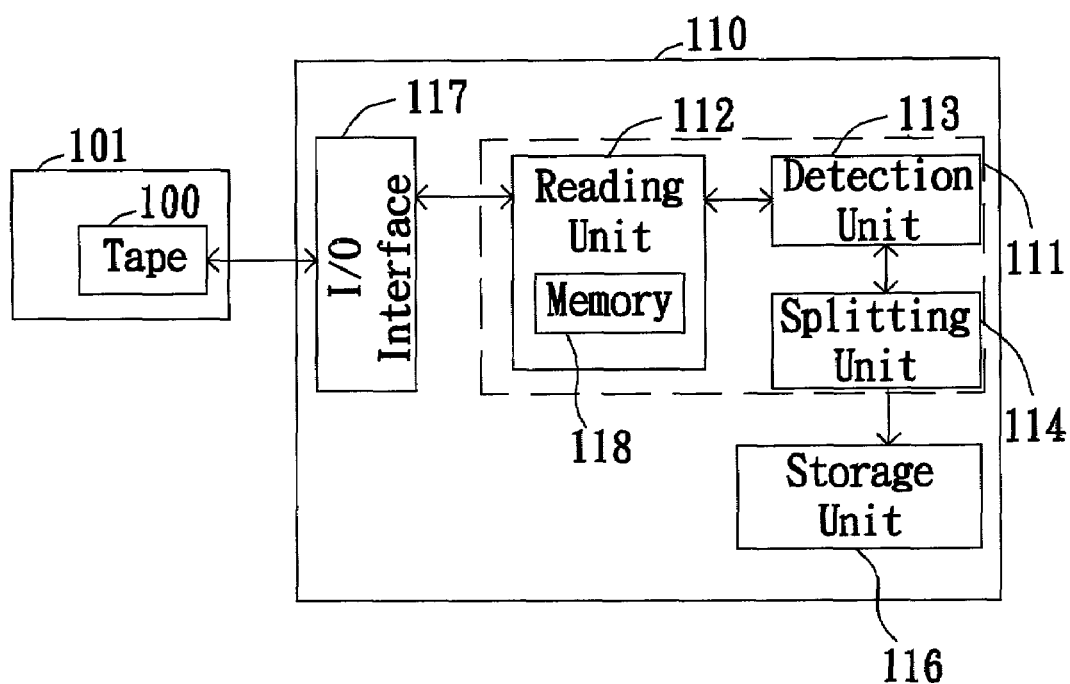
FIG. 1 is a block diagram of a device of digital video capture according to the preferred embodiment of the invention.

Please refer to FIG. 1. It shows a block diagram of a device of digital video capture according to the preferred embodiment of the invention. A device of digital video capture is for reading video data stored in a tape 100 to a computer system 110. The device of digital video capture includes a reading unit 112, a detection unit 113, and a splitting unit 114. The reading unit 112 includes a memory 118. The tape 110 is recorded by a digital video camcorder 101. Video data stored in the tape 100 includes many frames. The tape 100 can connect with the device of digital video capture 111 via a video Input/Output interface 117, such as IEEE-1394, and transfer the video in the tape 100 to the computer system 110.

Figure 2:
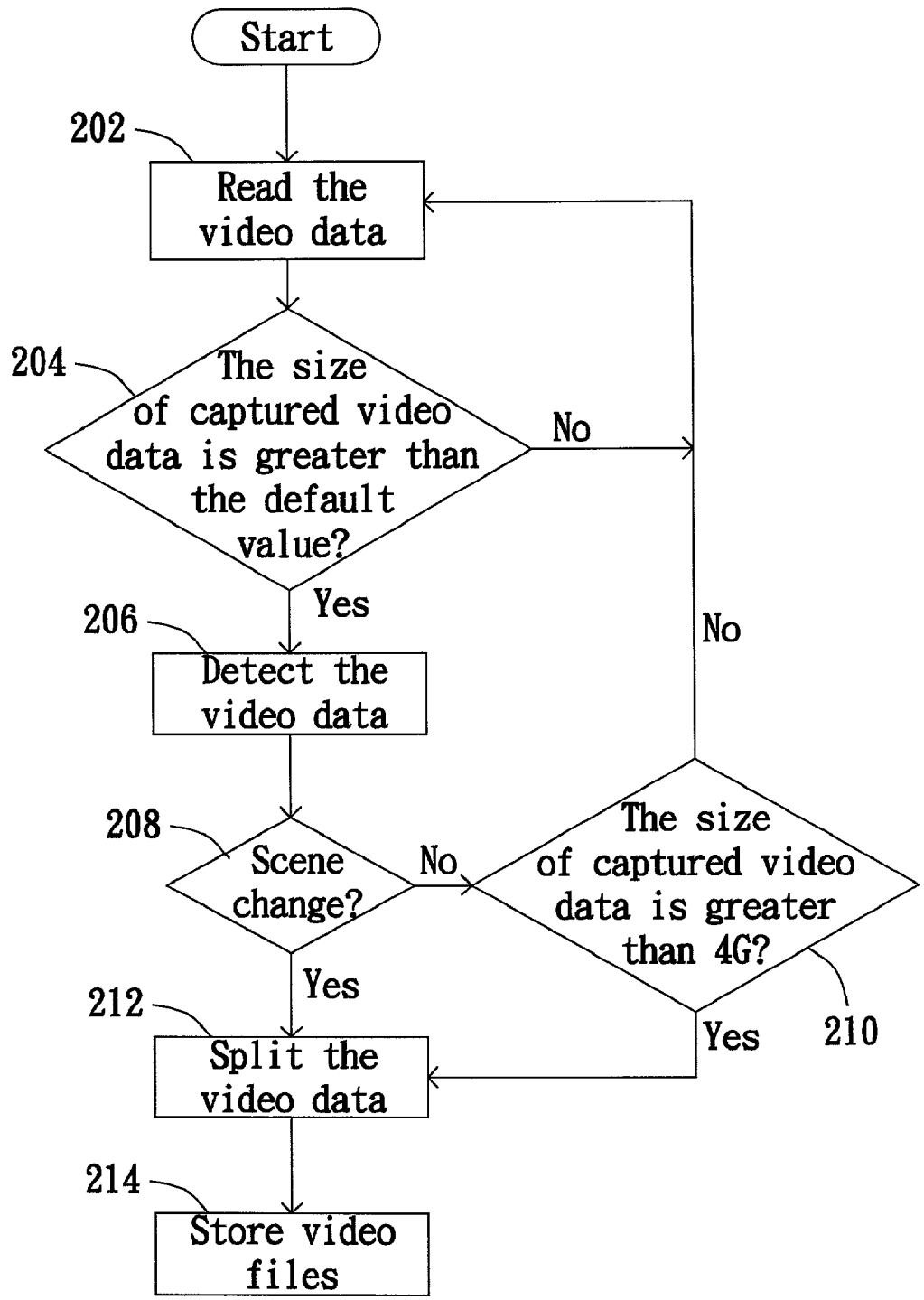
FIG. 2 is a flowchart of a method of digital video capture according to the preferred embodiment of the invention.

Please refer to FIG. 2. It shows a flowchart of a method of digital video capture according to the preferred embodiment of the invention. Step 202 is firstly started. The reading unit 112 reads video data from the tape 100 in order to capture frames and store in the memory 118 temporarily.

Step 204 is then performed to estimate firstly how big the size of the captured video data is by the detection unit 113. The default size of video data can be reset before Step 204. If the size of the captured video data is less than the default value, the reading unit 112 continues to read video data at Step 202. Step 206 is next performed when the size of the captured video data is greater than the default value.

At Step 206, the detection unit 113 continues to proceed video data detection. The change between scenes can be detected from the video data since the recording data, recording time, and recording code can be recorded in the tape 100 at the same time when the digital video 101 is working. And according to the recording time of frames, the detection unit 113 can calculate the interval of recording time between a frame and its adjacent frame, in order to detect different scene in the video data. In addition, via the detection unit 113, the detection of scene change can also be distinguished by the difference between object characters of a frame and its adjacent frame. Therefore, the method proceeds to Step 208 to decide whether there happen any scene changes or not.

The method proceeds to Step 210 if there is no scene change being detected by Step 208. At Step 210, whether or not the size of the present captured video data is greater than 4 GB is estimated. The method proceeds back to Step 202 to keep reading video data, if the size of the present captured video data is less than 4 GB. The method proceeds to Step 212 to split video data when the size of the present captured video data is greater than 4 GB. Finally at Step 214, the storage unit 116 stores the captured video data to be a video data of 4 GB.

A video data usually includes several scenes recorded. Suppose taking the change between Scene M and Scene M+1 as an example. The detection unit 113 calculates that the difference of the interval between the last frame of Scene M and the first frame of Scene M+1 is greater than the interval between 2 adjacent frames of others, therefore at Step 208, the method determines that there happens a scene change between 2 frames. Then the method proceeds to Step 212. The splitting unit 114 splits the video data for separating the frame of Scene M and the frame of Scene M+1. Next at Step 214, the frames from Scene 1 to Scene M are stored as one video data. Therefore the first spit video data can be stored in the computer 110, and the method keeps capturing the continuous video data as the above mentioned procedure.

When the video data in the tape 100 is in the process of video data splitting according to the above mentioned method of digital video capturing, several scenes in the tape 100 can totally be stored in the same file via the method of seamless capturing to let frames in the same scene to be stored in the same video file. And the captured video data from the tape is spit into several whole video files, which will be stored in the computer system 110.

Figure 3:
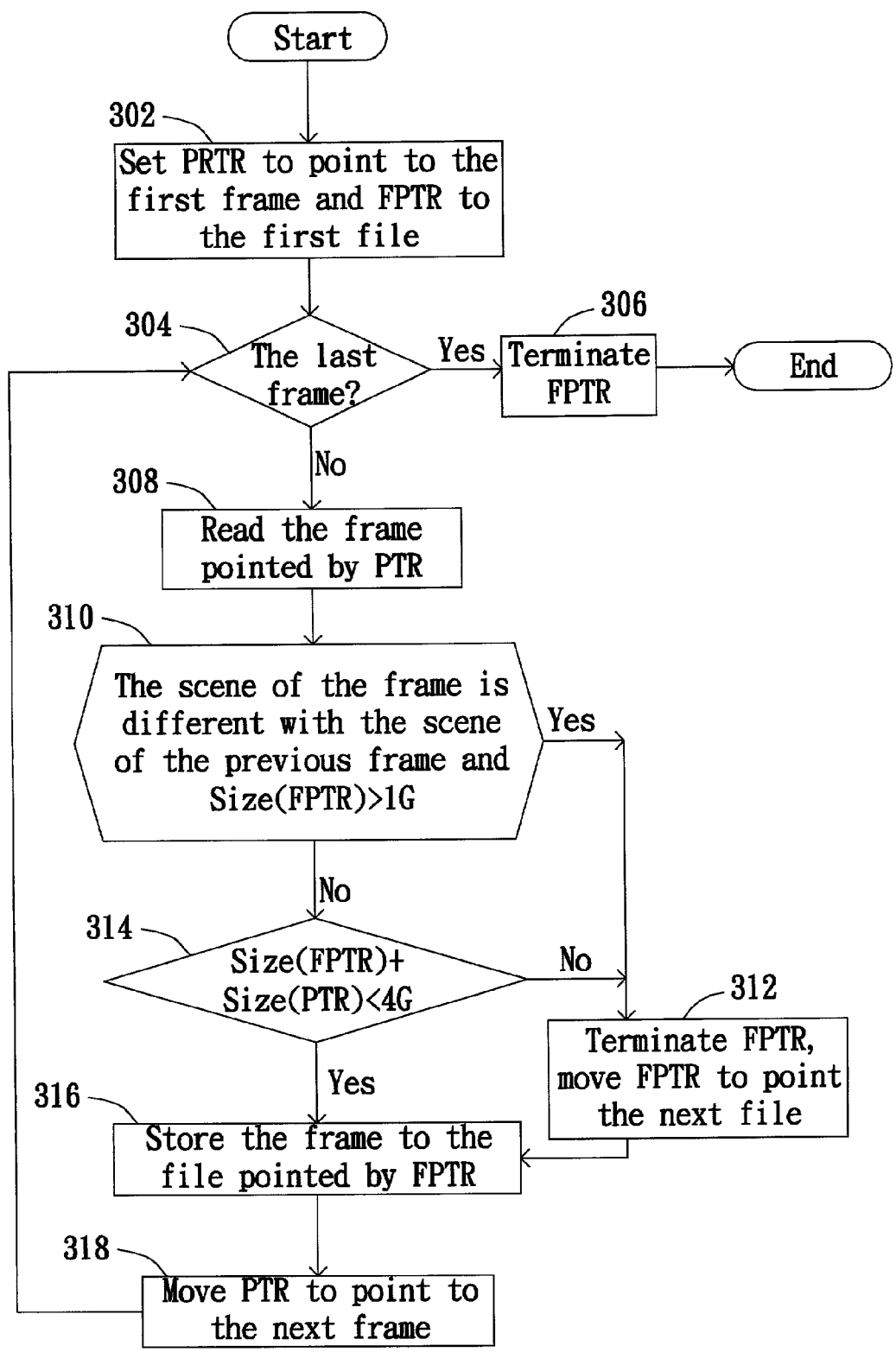
FIG. 3 is an operational flowchart of video frame capturing according to the preferred embodiment of the invention.

There is something noticeable. Before Step 204, the default value can be set in advance and then the method moves to the determination at Step 204. Therefore, users can split the most suitable size of video data as their need according to different settings for default value. Take as an example the default value of 1 GB for further explanation. Please refer to the operating flowchart of the capturing video fames illustrated in FIG. 3. The method starts the capturing operation as illustrated in FIG. 3. Firstly at Step 302, a pointer PTR points is set to the first frame of the tape 100 and a pointer FPTR is set to point to the first file. Next the method proceeds Step 304 to determine whether the frame pointed by the pointer PTR is the last frame of the video data or not. If yes, the pointer FPTR is terminated at Step 305 and the capturing operation is finished. If it is not the last frame, the method proceeds Step 308.

At Step 308, the method reads the frame pointed by the pointer PTR and the determination is made at Step 310. The method proceeds to Step 312 when the scene of the frame pointed by the pointer PTR is different from the scene of the previous frame, and the file size pointed by the pointer FPTR is greater than 1 GB. When the scene of the frame pointed by the pointer PTR is the same with the scene of the previous frame, or the file size pointed by the pointer FPTR is less than 1 GB, the method proceeds to Step 314 when one or two of the above conditions are fitted. At Step 314, the method proceeds to Step 316 when the sum of the file size pointed by the pointer FPTR, and the file size pointed by the pointer PTR is less than 4 GB. Otherwise, the method proceeds to Step 312 when the sum is greater than 4 GB. At Step 312, the method terminates the pointer FPTR, and moves the pointer FPTR to point the next file. Then the method proceeds to Step 316.

At Step 316, let the pointer PTR to point to the pointer FPTR in order to let the frame pointed by PTR to be stored to the file pointed by FPTR, then the method proceeds to Step 318. At Step 318, the method moves the pointer PTR to point to the next frame, and goes back to Step 304 to repeat continuously the above mentioned operational flowchart of video frame capturing.

Take the following example into account in order to have more clear description of the practical situation of splitting video data according to the method of digital video capture of this invention. Suppose there are 4 scenes, which are 5 minutes, 3 minutes, 4 minutes and 4 minutes long respectively, in the video data recorded in the tape. The storage spaces those scenes need are 1,050 MB, 630 MB, 840 MB, and 840 MB respectively. According to the above mentioned operational flowchart of video frame capturing, firstly the method starts at Step 302, then goes through Step 304, 308, 310, and 316, and finishes the first video frame capturing of the first scene. As long as the method finishes the last video frame capturing of the first scene via the capturing flowchart of Step 318, 304, 308, 310, and 312, the first scene can be stored as the first video file, whose file size is 1,050 MB. Next, the method finishes the first video frame capturing of the second scene via Step 316, 318, 304, 308, 310, 314, and 316. As long as the method finishes the last video frame capturing of the third scene via the capturing flowchart of Step 318, 304, 308, 310, and 312, the second and third scenes can be stored as the second video file, whose file size is 1,470 MB. Lastly, the method finishes the first video frame capturing of the forth scene via Step 316, 318, 304, 308, 310, 314, and 316. As long as the method finishes the last video frame capturing of the forth scene via the capturing flowchart of Step 318, 304, and 306, the forth scene can be stored as the third video file, whose file size is 1,470 MB. The method finishes splitting the video data for storage.

The method and device of digital video capture according to the invention, revealed by the above embodiments, capture video data by double estimates of file size and scene change and split captured video data on tapes into several whole video files. The invention not only provides an advantage of seamless capture, but also enables frames of the same scene to be stored in the same file. So several whole scenes in a video can be stored in the same file. The invention solves difficulties in traditional video editing process. By using editing software, a user can exactly control a digital video facility, and effectively improve quality and effect of video editing.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for capturing video data into a computer system, the method comprising the following steps:
   (a) reading the video data;
   (b) detecting the video data to estimate scene changes so that a unitary scene will not be split into two different files;
   (c) estimating a file size of the video data;
   (d) splitting the video data into a plurality of video files according to a scene change if the video data has the scene change, and according to a maximum file size if the video data does not have the scene change; and
   (e) storing the plurality of video files.

2. The method according to claim 1, wherein the step of detecting video data further comprises continuously reading video data when a scene change is not detected from the read video data that has a default size, and further the continuously read video data is not greater than a limitation of a file system.

3. The method according to claim 2, wherein the step of continuously reading video data will be stopped when a scene change is detected or the size of the video data is equal to the limitation of the file system.

4. The method according to claim 3, wherein the video data comprises at least a first scene and a second scene including a plurality of frames respectively.

5. The method according to claim 4, wherein an interval of recording time, between a frame and its adjacent frame is calculated as the estimate of scene change.

6. The method according to claim 5, wherein the interval between the last frame of the first scene and the first frame of the second scene is greater than the interval between 2 adjacent frames of others.

7. The method according to claim 4, wherein the difference between object characters of a frame and its adjacent frame is employed to determine whether scene change occurs.

8. The method according to claim 4, wherein frames of the first scene and frames of the second scene are split into different video files.

9. The method according to claim 8, wherein frames of the same scene are stored in the same video file.

10. The method according to claim 3, wherein the file size of video data for being split is determined when a scene change is detected.

11. A method for capturing video data into a computer system wherein the computer system comprises a storage unit, the method comprising the following steps:
    (a) reading a plurality of frames of the video data;
    (b) estimating the file size of the video data;
    (c) detecting a scene change between the frames so that a unitary scene will not be split into two different files;
    (d) splitting the video data into a plurality of video files according to a scene change if the video data has the scene change, and according to a maximum file size to be split if the video data does not have the scene change; and
    (e) storing the video files into a storage unit.

12. The method according to claim 11, wherein the method further comprises setting a default value for the size of video data before said step (b).

13. The method according to claim 12, wherein the method continues to proceed to said step (c) when the size of the captured video data is greater than the default value, and the method goes back to said step (a) when the size of the captured video data is less than the default value.

14. The method according to claim 13, wherein the video data comprises at least a first scene and a second scene.

15. The method according to claim 14, wherein the method further comprises calculating an interval of recording time between a frame and its adjacent frame in said step (c).

16. The method according to claim 15, wherein the interval between the last frame of the first scene and the first frame of the second scene is greater than the interval between 2 adjacent frames of others.

17. The method according to claim 14, wherein the determination of scene change in said step (b) further comprises distinguishing the difference between object characters of a frame and its adjacent frame.

18. The method according to claim 14, wherein in said step (d), frames of the first scene and frames of the second scene are split into different video files.

19. The method according to claim 18, wherein frames of the same scene are stored in the same video file.

20. The method according to claim 13, wherein the file size of video data for being split is determined when a scene change is detected.

21. A device for capturing video data stored in a tape into a computer system, wherein the computer system comprises a storage unit, the device of digital video capture comprising:
    a reading unit for reading video data;
    a detection unit for detecting changes of scenes so that a unitary scene will not be split into two different files;
    a determining unit for estimating a file size of the video data and determining a maximum file size to be split; and
    a splitting unit for splitting video data into a plurality of video files according to a scene change if the video data has the scene change, and according to the maximum file size if the video data does not have the scene change and then storing the video files into the storage unit.

22. The device according to claim 21, wherein the video data comprises a plurality of frames.

23. The device according to claim 22, wherein the reading unit further comprises a memory for storing the frames temporarily.

24. The device according to claim 21, wherein the reading unit will be used to continuously read video data when scene change is not detected by the detection unit and the size of video data is not greater than a limitation of a file system.

25. The device according to claim 21, wherein the reading unit is stopped from continuously reading video data when a scene change is detected by the detection unit or the size of the video data is equal to a limitation of a file system by the determining unit.

26. The device according to claim 25, wherein the determining unit determines the file size to be split when a scene change is detected by the detection unit.

* * * * *